(12) United States Patent
Ohmiya

(10) Patent No.: US 8,462,404 B2
(45) Date of Patent: Jun. 11, 2013

(54) IMAGE FORMING APPARATUS

(75) Inventor: Takashi Ohmiya, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 364 days.

(21) Appl. No.: 12/975,795

(22) Filed: Dec. 22, 2010

(65) Prior Publication Data
US 2011/0205596 A1    Aug. 25, 2011

(30) Foreign Application Priority Data
Feb. 19, 2010 (JP) ................................. 2010-035308

(51) Int. Cl.
*H04N 1/46* (2006.01)

(52) U.S. Cl.
USPC ............................. 358/504; 358/406; 358/1.9

(58) Field of Classification Search
None
See application file for complete search history.

(56) References Cited

U.S. PATENT DOCUMENTS

| | | | | |
|---|---|---|---|---|
| 5,950,036 | A  * | 9/1999 | Konishi | 399/8 |
| 6,160,968 | A  * | 12/2000 | Noda | 399/8 |
| 6,280,105 | B1 * | 8/2001 | Iida | 400/74 |
| 6,480,297 | B1 | 11/2002 | Suzuki et al. | |
| 6,775,025 | B1 * | 8/2004 | Robinson et al. | 358/1.15 |
| 7,609,414 | B2 * | 10/2009 | Kumada et al. | 358/1.9 |
| 7,965,407 | B2 * | 6/2011 | Yoshida | 358/1.16 |
| 8,264,755 | B2 * | 9/2012 | Nagayama et al. | 358/518 |
| 2005/0190407 | A1 * | 9/2005 | Yokoyama | 358/2.1 |
| 2006/0215212 | A1 * | 9/2006 | Tao | 358/1.14 |
| 2007/0058999 | A1 * | 3/2007 | Tao | 399/38 |
| 2007/0297835 | A1 | 12/2007 | Ikeda | |
| 2008/0231875 | A1 * | 9/2008 | Ohmiya | 358/1.9 |
| 2008/0239400 | A1 | 10/2008 | Yoshida | |

FOREIGN PATENT DOCUMENTS

| | | |
|---|---|---|
| EP | 0998119 A2 | 5/2000 |
| JP | 2000-134391 A | 5/2000 |
| JP | 2005-181534 | 7/2005 |
| JP | 2006-178899 A | 7/2006 |
| JP | 2008-003496 | 1/2008 |
| JP | 2008-023891 A | 2/2008 |
| JP | 2008-238459 | 10/2008 |

OTHER PUBLICATIONS

EP Extended Search Report and Opinion dated Oct. 29, 2012, EP Appln 10015338.6.
Anonymous: "Aging (scheduling)", Wikipedia, Jun. 17, 2009, 1 page, XP002684990, retrieved from Internet: URL:http://en.wikipedia.org/w/index.php?title=Aging_(scheduling)&oldid=297040566 [retrieved on Oct. 10, 2012].
JP Office Action dated Jan. 10, 2012 in corresponding Application No. 2010-035308; English Translation.
EP Search Report dated Jul. 3, 2012, EP Appln. 10015338.6-2216.

* cited by examiner

*Primary Examiner* — Dung Tran
(74) *Attorney, Agent, or Firm* — Banner & Witcoff, Ltd.

(57) ABSTRACT

An MFP places, in a standby state, a printing job (a first printing job) corresponding to a predetermined attribute among accepted printing jobs. A printing job other than the first printing job (a second printing job) is immediately processed. Then, the first printing job placed in a standby state is executed under condition of "execution of an obtaining process triggered by start of a process of the second printing job".

18 Claims, 5 Drawing Sheets

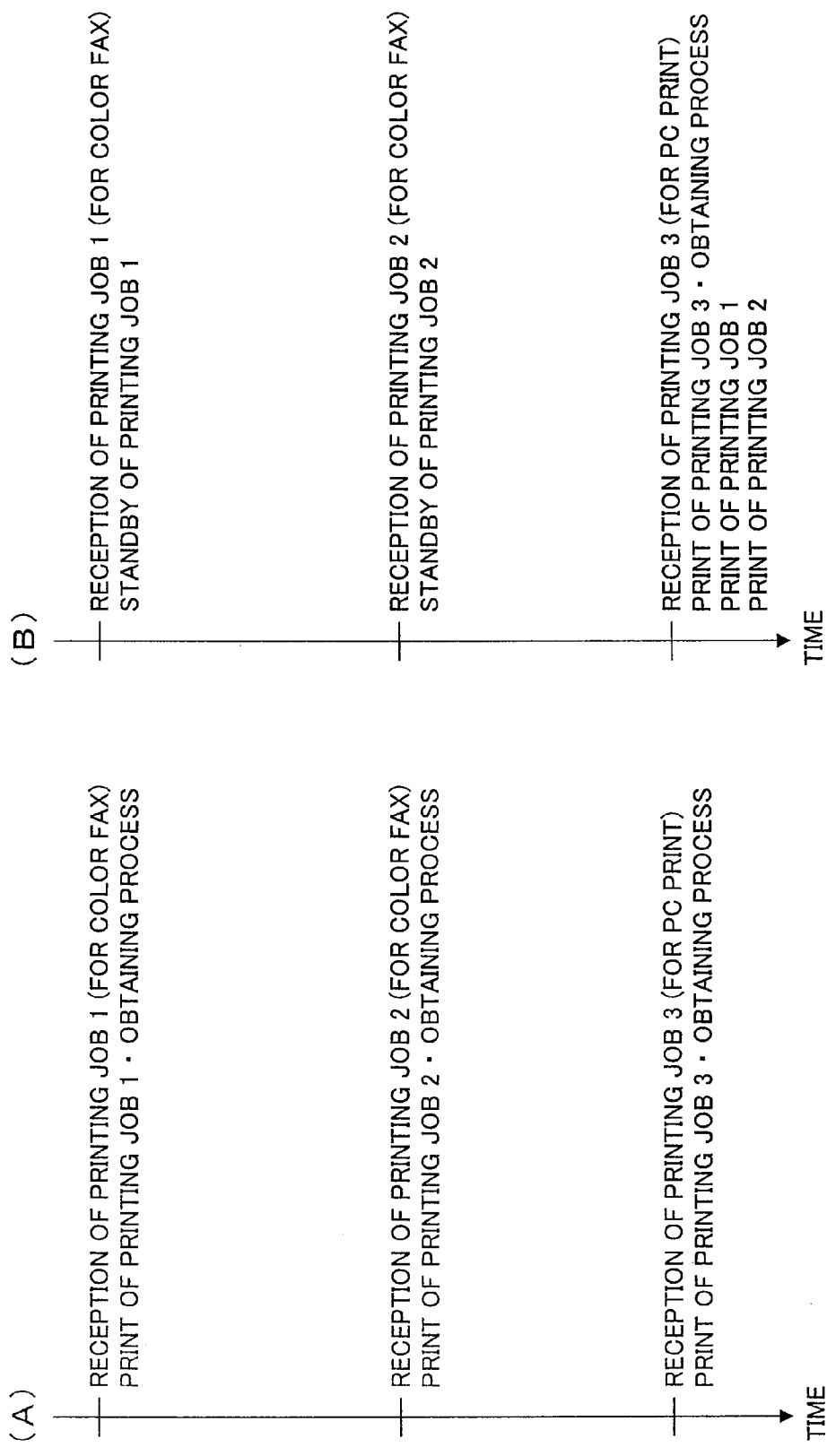

IMAGE FORMING APPARATUS

CROSS-REFERENCE TO RELATED APPLICATIONS

This non-provisional application claims priority under 35 U.S.C. §119(a) on Patent Application No. 2010-035308 filed in Japan on Feb. 19, 2010, the entire contents of which are hereby incorporated by reference.

TECHNICAL FIELD

The present invention relates to an image forming apparatus which forms a mark to be used for adjusting an image formation result to adjust the image formation result based on a correction value obtained by detecting the mark.

BACKGROUND

In an image forming apparatus, an image formation result is conventionally adjusted for avoiding deviation in a position and a density of an image. A procedure for adjusting an image formation result includes, for example, forming a resist pattern corresponding to a mark to be used for adjusting the image formation result on a belt member for conveying paper for each color, and obtaining deviation (i.e., a correction value) between a resist pattern of a reference color and a resist pattern of a subject color, so as to correct positional deviation of an image of the subject color based on the correction value.

Furthermore, a technique to form a mark to be used for adjusting an image formation result at timing in connection with a process of a printing job is known. For example, Japanese Patent Application Laid-open No. 2008-003496 discloses a technique to form a mark to be used for adjusting an image formation result before processing a printing job when vibration of an image forming apparatus is detected during standby.

SUMMARY

The conventional image forming apparatus has, however, the following problem: When a mark to be used for adjusting an image formation result is formed in connection with the process of a printing job, there is a possibility of forming the mark for each process of a printing job. For example, in the image forming apparatus disclosed in Japanese Patent Application Laid-open No. 2008-003496, if the image forming apparatus is frequently vibrated, requirements of forming a mark to be used for adjusting an image formation result are often satisfied in forming an image, and hence, the mark is frequently formed. Such frequent formation of the mark leads to wasteful consumption of consumables.

The present invention was devised for overcoming the problem of the conventional image forming apparatus. Specifically, an object of the invention is to provide an image forming apparatus which enables reduction of opportunities to form a mark to be used for adjusting an image formation result so as to control wasteful consumption of consumables.

In order to achieve the object, an image forming apparatus of this invention is an image forming apparatus comprising: accepting means for accepting a printing job including image data; image forming means for forming an image based on the printing job accepted by the accepting means; control means for controlling the accepting means and the image forming means and processing the printing job accepted by the accepting means; determining means for determining, when the accepting means accepts a printing job, whether the accepted printing job is a first printing job corresponding to a predetermined attribute or a second printing job not corresponding to the predetermined attribute; and standby means for placing, when the determining means determines that the printing job accepted by the accepting means is the first printing job, the first printing job in a standby state, wherein, when the determining means determines that the printing job accepted by the accepting means is the second printing job, the control means starts a process of the second printing job, and executes an obtaining process for obtaining information for adjusting an image formation result by using start of the process of the second printing job as a trigger, and the control means starts a process of the first printing job placed in a standby state, under condition of execution of the obtaining process triggered by the start of the process of the second printing job.

In the image forming apparatus of this invention, a first printing job corresponding to a predetermined attribute among accepted printing jobs is placed in a standby state. The "predetermined attribute" herein means an attribute previously set based on a type of printing job (such as copying, PC print or fax) or user information, and is not limited to one attribute but may be a combination of a plurality of attributes (such as color print and fax). The first printing job placed in a standby state is processed under condition of "execution of an obtaining process triggered by start of a process of a second printing job". It is noted that the execution of the obtaining process is triggered by the start of the process of the second printing job, and the execution time of the obtaining process during the process of the second printing job may be before, during or after a printing process to be performed in the process of the second printing job.

Specifically, in the image forming apparatus of this invention, when the first printing job is accepted, the accepted first printing job is placed in a standby state, and its process is suspended until there is an execution opportunity of the obtaining process triggered by the start of the process of the second printing job. Accordingly, in the image forming apparatus of this invention, in accepting the first printing job, execution opportunities of the obtaining process are reduced. As a result, it is possible to reduce the number of times of forming a mark to be used for adjusting an image formation result.

According to the present invention, an image forming apparatus which enables reduction of opportunities to form a mark to be used for adjusting an image formation result so as to control wasteful consumption of consumables is realized.

The above and further objects and features will more fully be apparent from the following detailed description with accompanying drawings.

BRIEF DESCRIPTION OF THE SEVERAL VIEWS OF THE DRAWINGS

FIG. 5 is a diagram illustrating examples of execution timing of a printing job and an obtaining process.

DETAILED DESCRIPTION

Now, an embodiment of an image forming apparatus according to the present invention will be described in detail with reference to the accompanying drawings. In this embodiment, the invention is applied to a multifunctional peripheral (MFP) having a color printing function and a fax sending/receiving function.

[Whole Structure of MFP]

Figure 1:
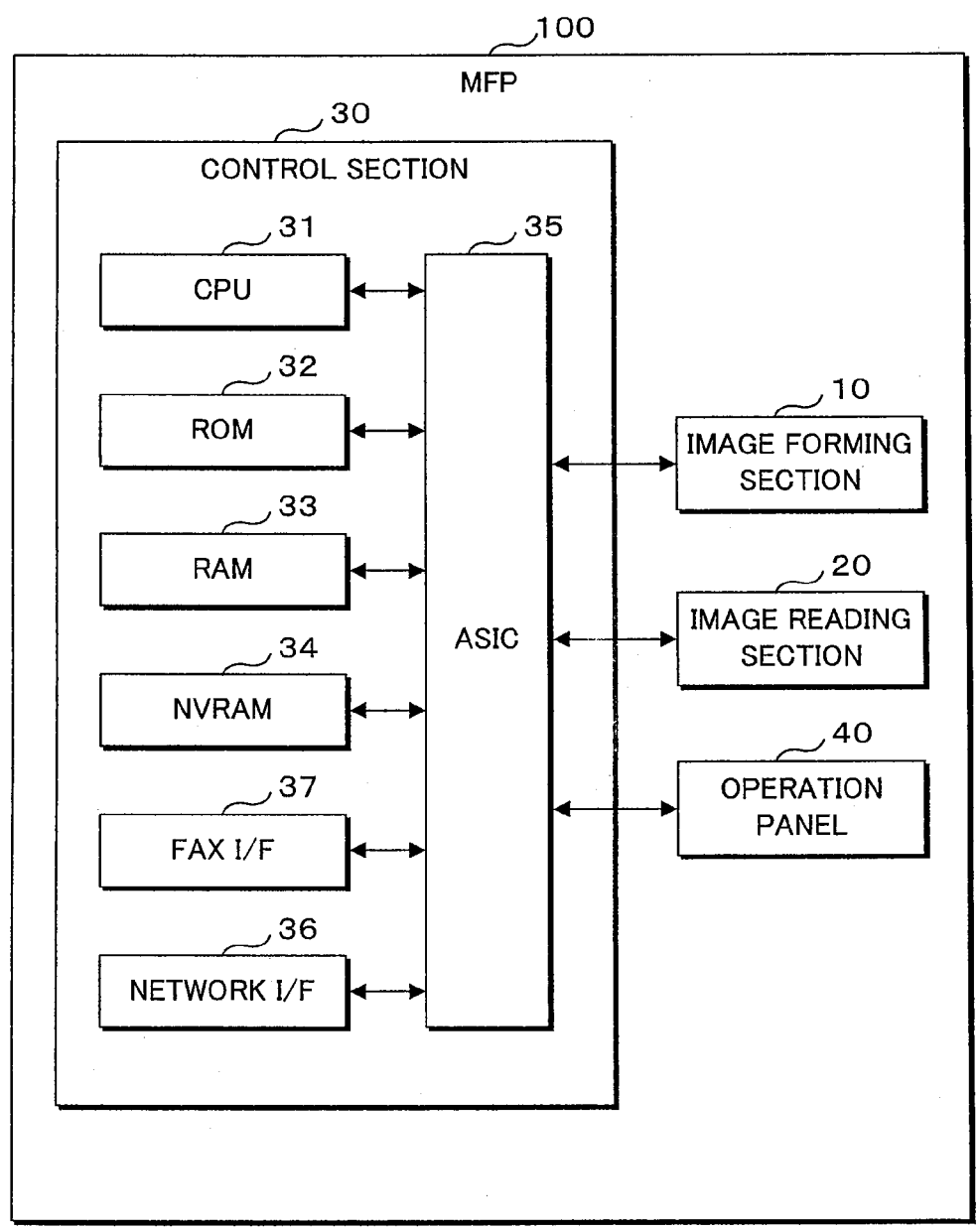
FIG. 1 is a block diagram illustrating the structure of an MFP according to an embodiment of the invention.

The MFP 100 of this embodiment comprises, as illustrated in FIG. 1, a control section 30 (corresponding to an example of control means, determining means and standby means) including a CPU 31, a ROM 32, a RAM 33 (corresponding to an example of memory means), an NVRAM (a nonvolatile RAM) 34, an ASIC 35, a network interface 36 (corresponding to an example of accepting means), and a fax interface 37 (corresponding to another example of the accepting means). Furthermore, the control section 30 is electrically connected to an image forming section 10 for forming an image on paper, an image reading section 20 for reading an image from a document and an operation panel 40 for displaying an operation state and accepting an input operation performed by a user.

The ROM 32 stores various control programs for controlling the MFP 100, various setting and initial values, and the like. The RAM 33 is used as a work area on which the various control programs are read or as a memory area for temporarily storing image data.

The CPU 31 controls the respective elements of the MFP 100 through the ASIC 35 in accordance with a control program read from the ROM 32 or signals sent from various sensors while storing processing results in the RAM 33 or the NVRAM 34.

The network interface 36 is connected to a network, so that the MFP 100 may be connected to another information processing device (such as a personal computer (PC)). The fax interface 37 is connected to a telephone circuit, so that the MFP 100 may be connected to a fax device on the other party. The MFP 100 may send/receive data to/from an external device through the network interface 36 or the fax interface 37.

[Structure of Image Forming Section of MFP]

Figure 2:
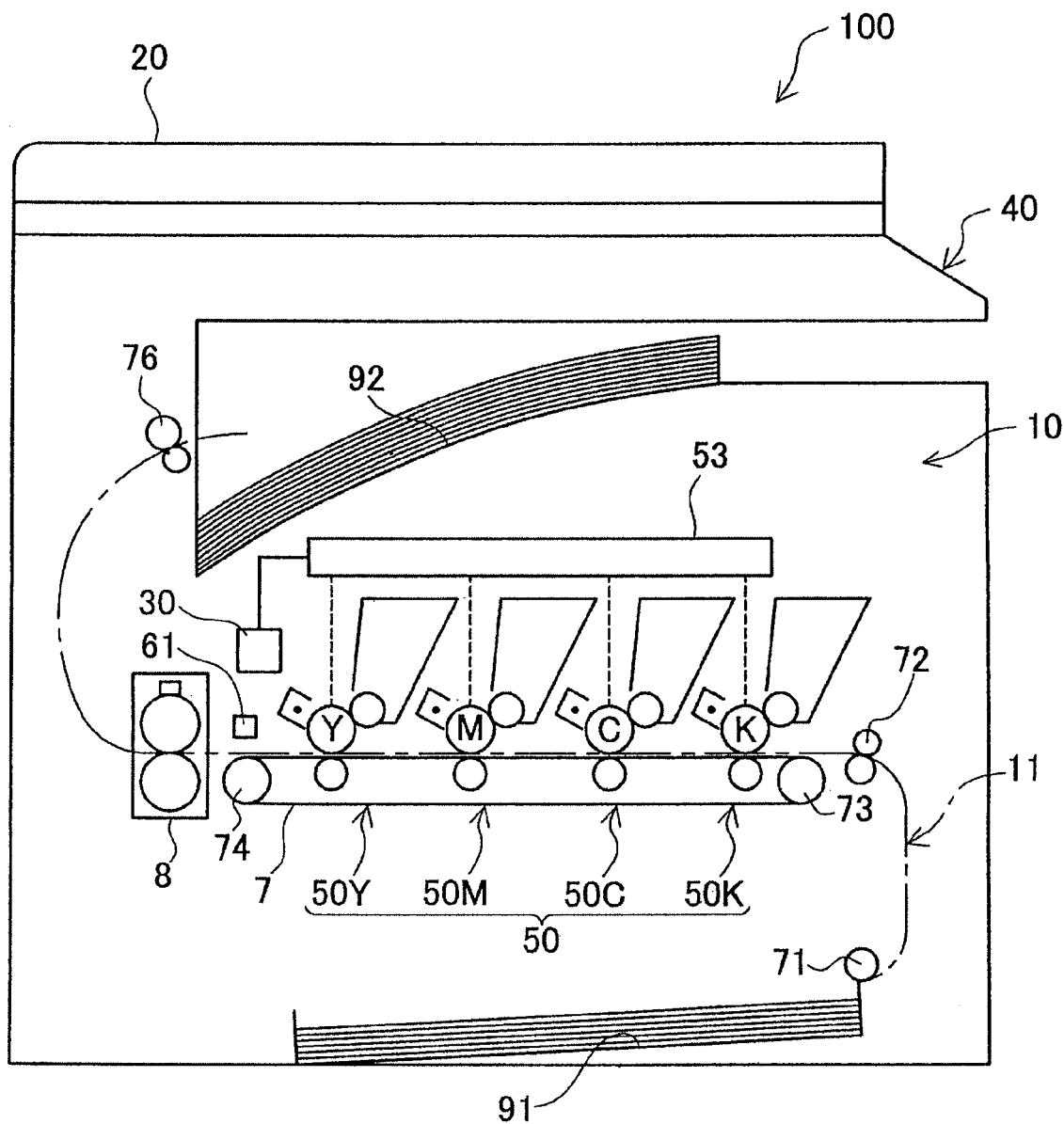
FIG. 2 is a schematic diagram illustrating the structure of an image forming section of the MFP.

Subsequently, the structure of the image forming section 10 of the MFP 100 will be described with reference to FIG. 2. The image forming section 10 includes a process section 50 for forming a toner image by the electrophotographic method and transferring the toner image onto paper; a fixing device 8 for fixing toner not yet fixed onto the paper; a paper feed tray 91 for placing paper not having an image transferred thereon; and a paper discharge tray 92 for placing paper having an image transferred thereon. The image reading section 20 is disposed above the image forming section 10.

In the image forming section 10, a conveyance path 11 (illustrated with an alternate long and short dash line in FIG. 2) in a substantially S shape is provided, so that paper contained in the paper feed tray 91 disposed in a bottom portion may be guided up to the paper discharge tray 92 disposed in an upper portion through a paper feeding roller 71, registration rollers 72, the process section 50, the fixing device 8 and paper discharge rollers 76.

The process section 50 is capable of forming a color image, in which process sections respectively corresponding to colors of yellow (Y), magenta (M), cyan (C) and black (K) are arranged in parallel. Specifically, the process section 50 includes a process section 50Y for forming an image of yellow Y, a process section 50M for forming an image of magenta M, a process section 50C for forming an image of cyan C and a process section 50K for forming an image of black K. The process sections 50Y, 50M, 50C and 50K are arranged to be spaced from one another by a constant distance in a paper conveying direction.

In the process section 50, a surface of a photosensitive body is uniformly charged by a charging device. Thereafter, the surface is exposed to light emitted from an exposing device 53, so as to form an electrostatic latent image of an image to be formed on paper. Subsequently, toner is supplied to the photosensitive body through a developing device. Thus, the electrostatic latent image formed on the photosensitive body is visualized as a toner image.

The image forming section 10 further includes the exposing device 53 for irradiating the process sections 50Y, 50M, 50C and 50K with light; a conveyance belt 7 for conveying paper to respective transfer positions of the process sections 50Y, 50M, 50C and 50K; and a mark sensor 61 for detecting a resist pattern formed on the conveyance belt 7.

The conveyance belt 7 is an endless belt member suspended around conveyance rollers 73 and 74 and is made of a resin material such as polycarbonate. The conveyance belt 7 is circularly moved in a counterclockwise direction on the drawing by rotatively driving the conveyance roller 74. Thus, paper placed thereon is conveyed from a side of the registration rollers 72 to a side of the fixing device 8.

The image forming section 10 takes out paper placed on the paper feed tray 91 one by one and conveys the paper onto the conveyance belt 7. Then, it transfers a toner image formed by the process section 50 onto the paper. At this point, in a color printing process, toner images are respectively formed by the process sections 50Y, 50M, 50C and 50K to be superimposed on the paper. On the other hand, in a monochrome printing process, a toner image is formed by the process section 50K alone to be transferred onto the paper. Thereafter, the paper having the toner image transferred thereon is conveyed to the fixing device 8, where the toner image is thermally fixed on the paper. Then, the paper having been subjected to the fixing operation is discharged to the paper discharge tray 92.

Furthermore, the mark sensor 61 is disposed in a position on the downstream side of the process sections 50Y, 50M, 50C and 50K and on the upstream side of the fixing device 8 in the paper conveying direction, so as to detect a pattern to be used for adjusting an image formation result formed on the conveyance belt 7.

Figure 3:
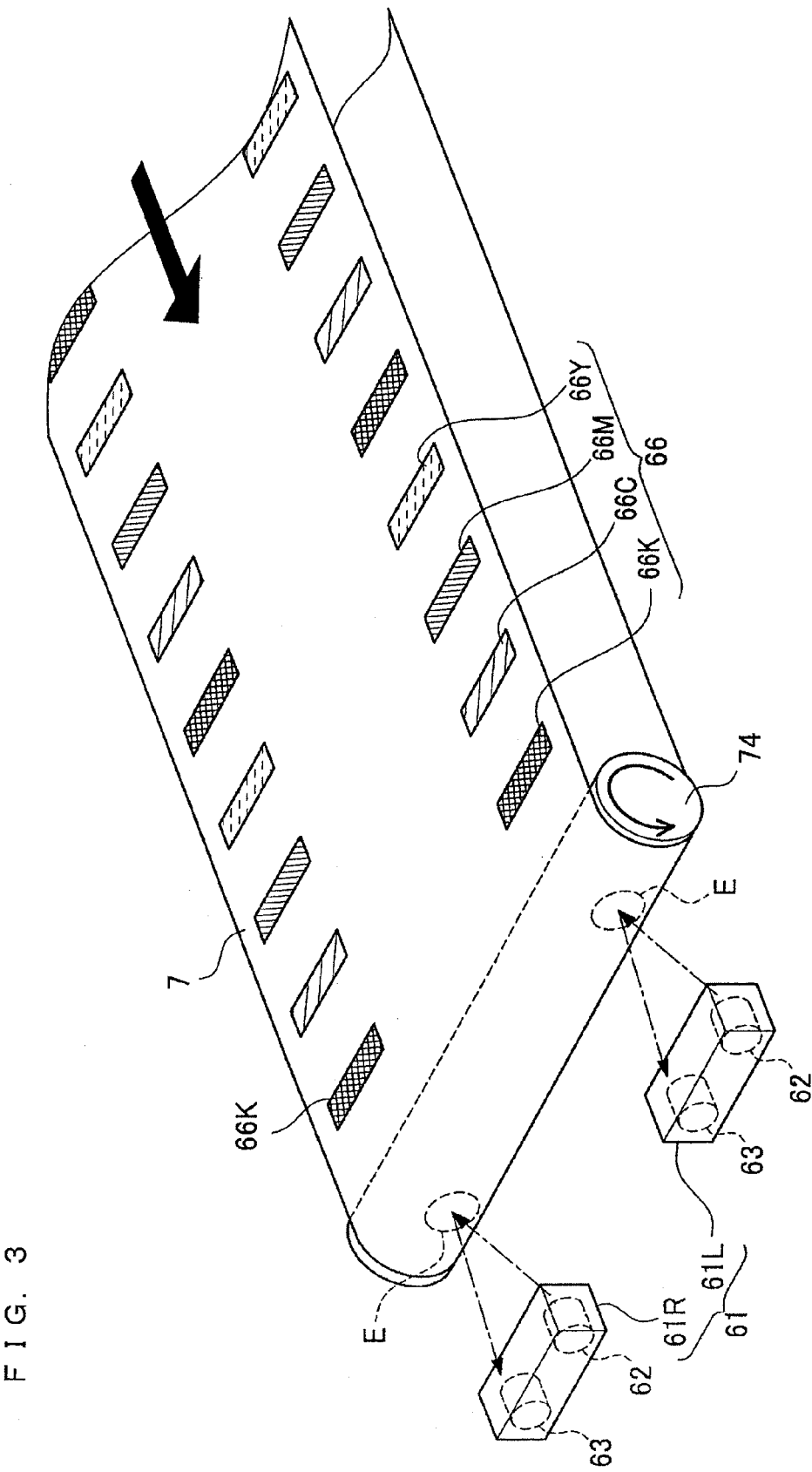
FIG. 3 is a conceptual diagram illustrating arrangement of a mark sensor employed in the MFP shown in FIG. 2.

Specifically, the mark sensor 61 includes, as illustrated in FIG. 3, two sensors, that is, a sensor 61R disposed on the right hand side in a width direction of the conveyance belt 7 and a sensor 61L disposed on the left hand side. Each of the sensors 61R and 61L is a reflection optical sensor including a pair of a light emitting device 62 (such as an LED) and a light receiving device 63 (such as a phototransistor). The mark sensor 61 irradiates a surface portion (surrounded with a broken line E in FIG. 3) of the conveyance belt 7 with light emitted from the light emitting device 62 on the angle and receives the reflected light by the light receiving device 63. Then, marks 66 to be used for adjusting an image formation result (which are illustrated in FIG. 3 as an example of marks for correcting positional deviation) may be detected in accordance with a difference between the quantity of light received from a mark 66 passing the position of the surface portion and the quantity of light directly received from the surface portion of the conveyance belt 7.

[Adjustment of Image Formation Result in MFP]

Subsequently, the adjustment of an image formation result to be performed in the MFP 100 will be described. In the MFP 100, the positional deviation correction for adjusting a position of an image of each color and the density deviation correction for adjusting a density of each color are carried out as the adjustment of an image formation result.

Now, the adjustment of an image formation result will be simply explained by describing the positional deviation correction as an example. The positional deviation correction includes an obtaining process for obtaining deviation (a correction value) of each color with respect to a reference color and a correction process for correcting an image based on the correction value. The obtaining process, which is triggered by the start of a process of a printing job, is executed when predetermined execution requirements are satisfied. The execution requirements are, for example, the number of copies printed after the previous obtaining process, the time period when power is supplied, a temperature condition, a humidity condition and detection of vibration. The correction process is executed, for example, each time a printing process is performed.

In the obtaining process, a resist pattern corresponding to an image pattern to be used for correcting positional deviation is first formed by the process sections 50Y, 50M, 50C and 50K. Specifically, the resist pattern is a mark group (hereinafter referred to as the resist pattern 66) including a mark 66K formed by the process section 50K, a mark 66C formed by the process section 50C, a mark 66M formed by the process section 50M and a mark 66Y formed by the process section 50Y arranged in a sub scanning direction as illustrated in FIG. 3.

The resist pattern 66 is formed at a constant interval in the sub scanning direction (corresponding to a moving direction of the conveyance belt 7 shown in FIG. 3). Each of the marks 66K, 66C, 66M and 66Y of this embodiment has a long rectangular shape extending in a main scanning direction (corresponding to a direction perpendicular to the sub scanning direction).

Next, the position of each mark 66K, 66Y, 66M or 66C is detected based on a binary signal output from the mark sensor 61. Then, a distance of the mark of each adjustment color (for example, the mark 66C, 66M or 66Y) from the mark of a reference color (for example, the mark 66K) in the sub scanning direction is calculated. A distance between the reference color and each adjustment color is varied when positional deviation in the sub scanning direction is caused. Therefore, deviation in the sub scanning direction of each adjustment color with respect to the reference color may be thus specified.

In the correction process, based on the deviation obtained in the obtaining process, process conditions (such as an exposure position and speeds of the conveyance belt 7 and the photosensitive body) of each adjustment color are adjusted so that a position of an image of the adjustment color may accord with a position of an image of the reference color.

It is noted that the aforementioned resist pattern 66 is merely exemplarily described and the resist pattern is not limited to that mentioned above. The resist pattern may be any general image pattern to be used for correcting positional deviation. For example, the resist pattern may have the shape of a pair of long rectangles at least one of which is inclined, by a predetermined angle, against a straight line extending in the main scanning direction. When such a resist pattern is employed, not only positional deviation in the sub scanning direction but also positional deviation in the main scanning direction may be specified.

Furthermore, also the density deviation correction may include, in the same manner as the positional deviation correction, an obtaining process for obtaining a correction value with respect to a predetermined image density and a correction process for correcting an image based on the correction value. In the obtaining process, density patterns, that is, image patterns having different color densities in the sub scanning direction, are formed by the process sections 50Y, 50M, 50C and 50K. Then, the quantities of light reflected from the density patterns are detected by the sensor commonly used in the positional deviation correction or another optical sensor. In this embodiment, for example, the sensor 61L is used for the detection. The color density is specified based on the quantity of the reflected light, to calculate a difference from a target color density as a correction value. On the other hand, in the correction process, process conditions (such as exposure intensity, an exposure range and developing bias) for each color are adjusted based on the correction value so as to retain the target color density.

[Management of Printing Job]

Subsequently, management of a printing job to be performed in the MFP 100 will be described. When a printing job is received, the MFP 100 places a specific printing job (i.e., a first printing job) in a standby state without immediately processing it. Then, the specified printing job having been placed in a standby state is processed after processing a printing job other than the specific printing job (i.e., a second printing job).

Since the process of the specific printing job (i.e., the first printing job) is thus postponed, it is preferably a printing job with low urgency for printing. For example, regarding fax data, there is a low possibility that a sender of fax data receives print of the fax data. Therefore, it may be determined that fax data has lower urgency (for example, there is longer time before the print is received) as compared with a printing job in which print of data is more highly possibly received by a sender of the data (for example, a printing job transmitted from a PC or a printing job instructed through the operation panel). Furthermore, an operation report such as a communication management report may be determined to have lower urgency. In this embodiment, fax data is described as the specific printing job (the first printing job).

Figure 4:
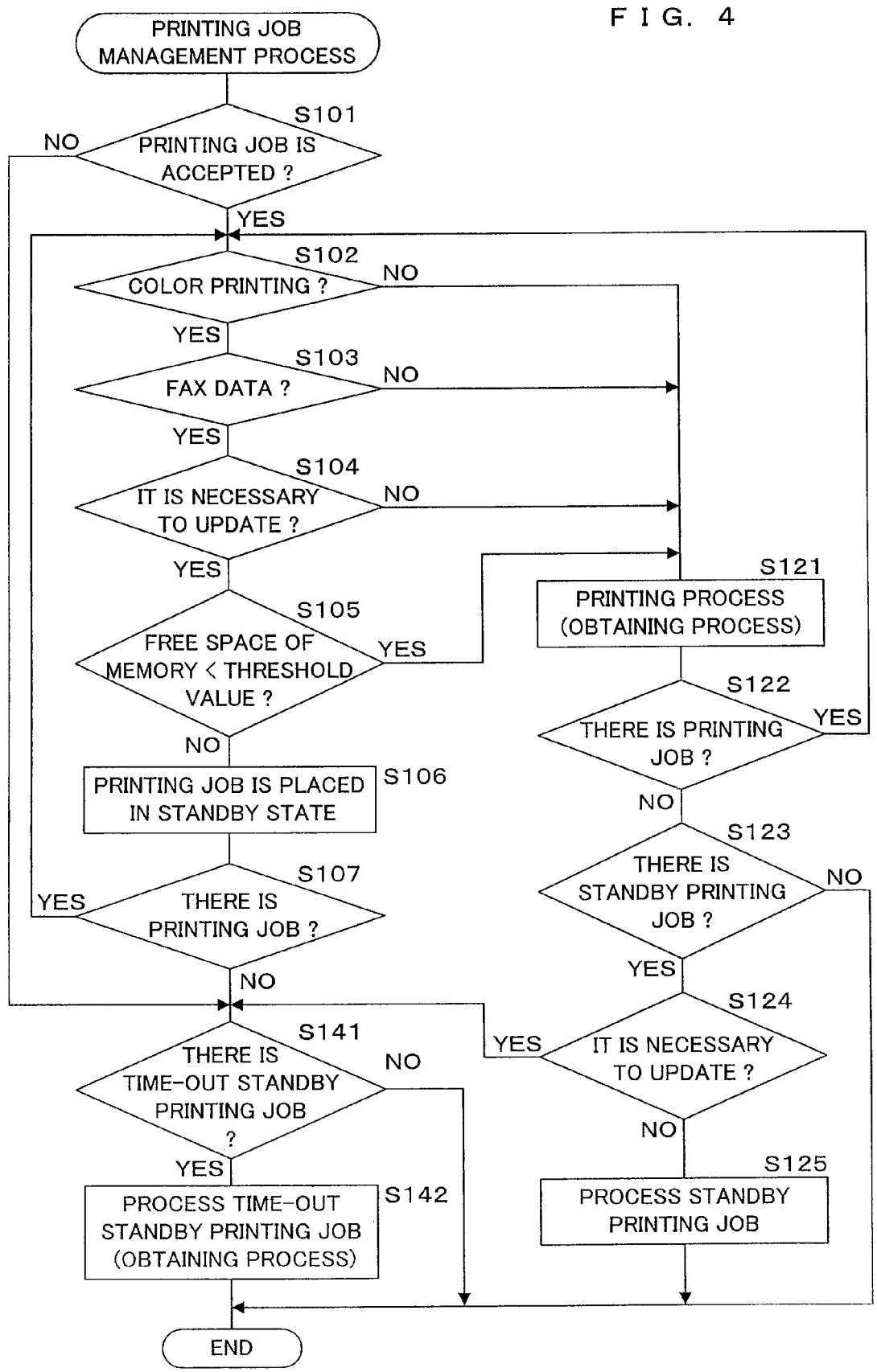
FIG. 4 is a flowchart illustrating procedures in a printing job management process.

Now, a printing job management process for realizing the aforementioned operation (corresponding to an example of control means, determining means and standby means) will be described with reference to a flowchart of FIG. 4. A process for receiving such a printing job is periodically executed at a predetermined time interval (of, for example, 1 second).

First, it is determined whether or not a printing job is accepted (S101). As kinds of printing jobs, there are, a printing job instructed through the operation panel (such as a copying instruction), a printing job transmitted from a PC, a printing job based on reception of a fax and a printing job previously set in the MFP 100 (such as a communication management report), for example. When none of these printing jobs is accepted (NO in S101), the process proceeds to S141. A process to be performed in and after S141 will be described later.

When any printing job is accepted (YES in S101), it is determined whether or not the accepted printing job is a color printing process (S102). When the printing job is not a color printing process (NO in S102), namely, when the printing job is a monochrome printing process, it may be determined that there is no need to adjust an image formation result. Therefore, the process proceeds to S121 for performing a printing process.

When the printing job is a color printing process (YES in S102), it is determined whether or not a kind of the printing job is fax data (S103). In this embodiment, a printing job for fax data is determined as a printing job with low urgency and the other printing jobs are determined as printing jobs with high urgency. Therefore, when the kind of the printing job is not fax data (NO in S103), the process proceeds to S121 for immediately processing the printing job.

When the printing job is fax data (YES in S103), it is determined whether or not it is necessary to update a correction value (S104). In S104, it is determined, based on execution requirements for executing the obtaining process, whether or not the execution requirements are satisfied or will be satisfied soon. When the execution requirements are not satisfied, the execution of the obtaining process is not triggered by the start of the process of the printing job, and it is determined that there is no need to update the correction value. At this point, when it is determined that there is no need to update the correction value (NO in S104), the process proceeds to S121 for immediately processing the printing job.

When it is determined that it is necessary to update the correction value (YES in S104), it is determined whether or not a free space of a memory is smaller than a threshold value (S105). When a free space of the memory is small, if a printing job is placed in a standby state for a long period of time, the load of the memory for the other process is increased. Therefore, when the free space of the memory is smaller than the threshold value (YES in S105), the process proceeds to S121 for immediately executing the printing process to secure a free space of the memory.

When the free space of the memory is not less than the threshold value (NO in S105), the printing job is placed in a standby state (S106). Specifically, when the accepted printing job is a color printing process for fax data, it is necessary to update the correction value and the memory has a sufficient free space, the printing job (that is, an example of the first printing job) is not immediately processed but is placed in a standby state. Hereinafter, a printing job thus placed in a standby state is designated as the "standby printing job".

Thereafter, it is determined whether or not there is a printing job having been accepted (S107). When there is a printing job having been accepted (YES in S107), the process returns to S102. When there is no printing job having been accepted (NO in S107), the process proceeds to S141. The process performed in and after S141 will be described later.

Subsequently, a process performed in and after S121 will be described. When the accepted printing job is a monochrome printing job (NO in S102) or a printing job for data other than fax data (NO in S103), there is no need to update the correction value (NO in S104) or a free space of the memory is not sufficient (YES in S105), the accepted printing job is processed (S121).

Incidentally, it is determined in S121 by using the start of the process of the printing job as a trigger whether or not the execution requirements of the obtaining process are satisfied, and when the execution requirements are satisfied, the obtaining process is executed. Specifically, a mark to be used for adjusting an image formation result is formed. Alternatively, the determination on the execution requirements for the obtaining process may be made any time after determining to process the printing job. The execution of the obtaining process is triggered by the start of the process of a printing job, and the execution time of the obtaining process during the process of the printing job may be before, during or after a printing process to be performed in the process of the printing job.

After completing the process of the printing job in S121, it is determined whether or not there is any printing job having been accepted (S122). When there is a printing job having been accepted (YES in S122), the process returns to S102. When there is no printing job having been accepted (NO in S122), it is determined whether or not there is a standby printing job (S123). When there is no standby printing job (NO in S123), the process is terminated.

When there is a standby printing job (YES in S123), it is determined whether or not it is necessary to update the correction value. Specifically, it is determined whether or not the execution requirements for executing the obtaining process are satisfied or will be satisfied soon (S124). When there is no need to update the correction value (NO in S124), the standby printing job is processed (S125). After S125, the process is terminated.

When it is necessary to update the correction value (YES in S124), the process proceeds to S141. Specifically, the standby printing job is kept to be in the standby state without immediately processing and the obtaining process is not executed. In other words, there is a possibility that the obtaining process may have been executed in the process of the printing job of S121, and hence, if the process of the printing job is allowed when it is necessary to update the correction value, the obtaining process may be executed plurality of times in a short period of time. Therefore, when it is necessary to update the correction value, the standby printing job is kept in the standby state, so as to avoid execution of the obtaining process in connection with the standby printing job.

Next, the process performed in and after S141 will be described. First, it is determined whether or not there is a standby printing job having been in the standby state for a time period (standby time) not less than predetermined time since it was placed in the standby state (i.e., whether or not there is a time-out standby printing job) (S141). When there is no time-out standby printing job (NO in S141), the process is terminated.

On the other hand, when there is a time-out standby printing job (YES in S141), standby printing jobs corresponding to time-out standby printing jobs are all processed (S142). Thus, a standby printing job may be avoided from being left in the standby state for a long period of time. After S142, the process is terminated.

Incidentally, in the same manner as in S121, when the execution requirements for the obtaining process are satisfied in performing the printing process in S142, the obtaining process is executed before, after or during the process of the time-out standby printing job.

[Exemplary Comparison]

FIG. 5 illustrates exemplary comparison in timing of execution of the obtaining process between a conventional example (A) and the present embodiment (B). In FIG. 5, the ordinate indicates time, in which time passes in the downward direction. In the case illustrated in this drawing, it is assumed that a printing job 1 (for color fax), a printing job 2 (for color fax) and a printing job 3 (for PC print) are accepted in this order at certain time intervals. Furthermore, it is assumed that execution requirements for the obtaining process are frequently satisfied (for example, the image forming apparatus is frequently vibrated as exemplarily described in Japanese Patent Application Laid-open No. 2008-003496).

In the conventional example, a printing job is processed subsequently to receipt of the printing job. When the execution requirements are satisfied in processing each printing job, the obtaining process is executed in connection with the process of the printing job. Therefore, as illustrated as (A) in FIG. 5, the obtaining process is executed three times at the maximum.

On the other hand, in the present embodiment, when the kind of printing job is color fax and the execution requirements are satisfied in accepting the printing job, the accepted printing job (that is, the printing job 1 or 2 in the drawing) is placed in a standby state without processing it as illustrated as (B) in FIG. 5. Since the printing process is not performed, the obtaining process is not executed. Then, the obtaining process is executed in connection with the process of the subsequent printing job for the PC print (that is, the printing job 3 in the drawing), and the standby printing job is processed subsequently to the printing job for the PC print. In other words, the obtaining process is avoided to be performed each time a printing job is accepted in this embodiment, and as a result, it is possible to reduce the number of times of executing the obtaining process as compared with the conventional example.

As described in detail so far, in the MFP 100 of this embodiment, a printing job (a first printing job) corresponding to a predetermined attribute (as determined in S103) is temporarily placed in a standby state when it is accepted. The printing process of the first printing job thus having been placed in the standby state is suspended until there is an opportunity to execute the obtaining process triggered by the start of process of a printing job (a second printing job) other than the first printing job. Furthermore, the MFP 100 executes the obtaining process by using the start of the process of a printing job as a trigger, and hence, the obtaining process is not executed unless a printing process is performed. Accordingly, in the MFP 100, the number of opportunities to execute the obtaining process is reduced in accepting the first printing job. As a result, it is possible to reduce the number of times of forming a mark to be used for adjusting an image formation result.

It is noted that the embodiment is merely exemplarily described and does not restrict the present invention at all. Accordingly, it goes without saying that the present invention may be changed or modified without departing from the scope of the invention. For example, the image forming apparatus is not limited to the MFP but the invention is applicable to any apparatus having a printing function, such as a printer or a copying machine.

Furthermore, although the invention is applied to the MFP having a color printing function in this embodiment, the image forming apparatus is not limited to a color printing apparatus. The invention is applicable to, for example, a monochrome printing apparatus as far as a mark is formed for correcting positional deviation or correcting density deviation.

Moreover, the present invention is applied to the image forming apparatus which forms a mark on the paper conveyance belt in this embodiment, but the invention is not limited to this. For example, the invention is applicable even to an image forming apparatus having an intermediate transfer belt in forming a mark on the intermediate transfer belt.

Furthermore, although a printing job for fax data is set as a standby printing job in this embodiment, the standby printing job is not limited to this. For example, a printing job for a communication management report may be set as the standby printing job. Alternatively, urgency of a printing job may be set for each user that instructs a printing job, so as to determine whether or not a printing job is set as a standby printing job based on a user having instructed the printing job.

Moreover, although a printing job is placed in a standby state only in performing a color printing process in this embodiment, a printing job may be placed in a standby state also in performing a monochrome printing process. Furthermore, although a printing job is placed in a standby state only when it is necessary to update a correction value in this embodiment, for example, all first printing jobs may be placed in a standby state regardless of the correction value. In addition, although a printing job is placed in a standby state in accordance with a free space of the memory in this embodiment, a printing job may be placed in a standby state regardless of a free space of the memory.

Furthermore, the process of a first printing job having been placed in a standby state is executed after processing a second printing job (as in S125) in this embodiment, but the invention is not limited to this. Specifically, the process of the first printing job may be executed before processing a printing job not placed in a standby state. In this case, the obtaining process triggered by the start of the process of a second printing job is executed before processing the second printing job in S121. Then, after the obtaining process, the process of the first printing job and the process of the second printing job are executed in this order.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image forming apparatus, comprising:
an accepting section for accepting a printing job including image data;
an image forming section for forming an image based on the printing job accepted by the accepting section; and
a controller for controlling the accepting section and the image forming section and processing the printing job accepted by the accepting section,
wherein the controller determines, when the accepting section accepts a printing job, whether the accepted printing job is a first printing job corresponding to a predetermined attribute or a second printing job not corresponding to the predetermined attribute,
when it is determined that the printing job accepted by the accepting section is the first printing job, the controller places the first printing job in a standby state,
when it is determined that the printing job accepted by the accepting section is the second printing job, the controller starts a process of the second printing job, and executes an obtaining process for obtaining information for adjusting an image formation result by using start of the process of the second printing job as a trigger, and
the controller starts a process of the first printing job placed in a standby state, under condition of execution of the obtaining process triggered by the start of the process of the second printing job.

2. The image forming apparatus according to claim 1, wherein the controller forms and detects a mark to be used for adjusting the image formation result by using the image forming section and obtains a correction value to be used for adjusting the image formation result based on a detection result of the formed mark, as the obtaining process.

3. The image forming apparatus according to claim 1, wherein the controller determines whether or not execution requirements for the obtaining process are satisfied, and the controller places the first printing job in a standby state when it is determined that the execution requirements for the obtaining process are satisfied.

4. The image forming apparatus according to claim 1, wherein the controller processes the first printing job after processing the second printing job.

5. The image forming apparatus according to claim 1, further comprising a memory,
wherein the controller determines whether or not a free space of the memory is smaller than a predetermined threshold value, and the controller processes the first printing job without placing in a standby state when the controller determines that the free space of the memory is smaller than the predetermined threshold value.

6. The image forming apparatus according to claim 1, wherein the controller determines whether or not standby time of the first printing job placed in a standby state is not less than predetermined time, and the controller processes the first printing job when the controller determines that the standby time of the first printing job placed in a standby state is not less than the predetermined time.

7. The image forming apparatus according to claim 1, wherein the controller does not determine a monochrome printing job as the first printing job.

8. The image forming apparatus according to claim 1, wherein the controller determines a printing job with low urgency as the first printing job and determines a printing job with high urgency as the second printing job.

9. The image forming apparatus according to claim 1, wherein the controller determines a printing job based on reception of a fax as the first printing job.

10. An image forming apparatus comprising:

accepting means for accepting a printing job including image data;

image forming means for forming an image based on the printing job accepted by the accepting means;

control means for controlling the accepting means and the image forming means and processing the printing job accepted by the accepting means;

determining means for determining, when the accepting means accepts a printing job, whether the accepted printing job is a first printing job corresponding to a predetermined attribute or a second printing job not corresponding to the predetermined attribute; and standby means for placing, when the determining means determines that the printing job accepted by the accepting means is the first printing job, the first printing job in a standby state, wherein, when the determining means determines that the printing job accepted by the accepting means is the second printing job, the control means starts a process of the second printing job, and executes an obtaining process for obtaining information for adjusting an image formation result by using start of the process of the second printing job as a trigger, and the control means starts a process of the first printing job placed in a standby state, under condition of execution of the obtaining process triggered by the start of the process of the second printing job.

11. The image forming apparatus according to claim 10, wherein the control means forms and detects a mark to be used for adjusting the image formation result by using the image forming means and obtains a correction value to be used for adjusting the image formation result based on a detection result of the formed mark, as the obtaining process.

12. The image forming apparatus according to claim 10, wherein the determining means determines whether or not execution requirements for the obtaining process are satisfied, and the standby means places the first printing job in a standby state when the determining means determines that the execution requirements for the obtaining process are satisfied.

13. The image forming apparatus according to claim 10, wherein the control means processes the first printing job after processing the second printing job.

14. The image forming apparatus according to claim 10, further comprising memory means, wherein the determining means determines whether or not a free space of the memory means is smaller than a predetermined threshold value, and the control means processes the first printing job without placing in a standby state when the determining means determines that the free space of the memory means is smaller than the predetermined threshold value.

15. The image forming apparatus according to claim 10, wherein the determining means determines whether or not standby time of the first printing job placed in a standby state by the standby means is not less than predetermined time, and the control means processes the first printing job when the determining means determines that the standby time of the first printing job placed in a standby state by the standby means is not less than the predetermined time.

16. The image forming apparatus according to claim 10, wherein the determining means does not determine a monochrome printing job as the first printing job.

17. The image forming apparatus according to claim 10, wherein the determining means determines a printing job with low urgency as the first printing job and determines a printing job with high urgency as the second printing job.

18. The image forming apparatus according to claim 10, wherein the determining means determines a printing job based on reception of a fax as the first printing job.

* * * * *